United States Patent
Konya et al.

(10) Patent No.: US 11,572,532 B2
(45) Date of Patent: *Feb. 7, 2023

(54) ANTIMICROBIAL COMPOSITION

(71) Applicant: The Procter & Gamble Company, Cincinnati, OH (US)

(72) Inventors: Abigail Mary Konya, Newcastle upon Tyne (GB); Adam Simon Hayward, Durham (GB); Eva Maria Perez-Prat Vinuesa, Newcastle upon Tyne (GB)

(73) Assignee: The Procter & Gamble Company, Cincinnati, OH (US)

(*) Notice: Subject to any disclaimer, the term of this patent is extended or adjusted under 35 U.S.C. 154(b) by 138 days.

This patent is subject to a terminal disclaimer.

(21) Appl. No.: 16/932,857

(22) Filed: Jul. 20, 2020

(65) Prior Publication Data

US 2021/0032574 A1 Feb. 4, 2021

(30) Foreign Application Priority Data

Jul. 29, 2019 (EP) .................................... 19188856

(51) Int. Cl.
| | |
|---|---|
| *C11D 1/722* | (2006.01) |
| *C11D 1/75* | (2006.01) |
| *C11D 3/48* | (2006.01) |
| *C11D 1/58* | (2006.01) |
| *C11D 1/645* | (2006.01) |
| *C11D 1/00* | (2006.01) |
| *C11D 1/72* | (2006.01) |
| *C11D 3/28* | (2006.01) |
| *C11D 3/04* | (2006.01) |
| *C11D 17/04* | (2006.01) |

(52) U.S. Cl.
CPC .................. *C11D 3/48* (2013.01); *C11D 1/00* (2013.01); *C11D 1/58* (2013.01); *C11D 1/645* (2013.01); *C11D 1/72* (2013.01); *C11D 1/722* (2013.01); *C11D 1/75* (2013.01); *C11D 3/044* (2013.01); *C11D 3/28* (2013.01); *C11D 17/041* (2013.01)

(58) Field of Classification Search
CPC ............. C11D 1/00; C11D 1/72; C11D 1/722; C11D 1/75; C11D 3/044; C11D 3/28; C11D 3/33; C11D 17/041
USPC ....... 510/238, 383, 421, 422, 432, 433, 477, 510/500
See application file for complete search history.

(56) References Cited

U.S. PATENT DOCUMENTS

| | | | | |
|---|---|---|---|---|
| 7,838,485 | B2* | 11/2010 | Heisig ...................... | C11D 1/72 510/225 |
| 2001/0036963 | A1* | 11/2001 | Behrends ................ | A61K 8/604 514/332 |
| 2003/0119705 | A1* | 6/2003 | Barnabas .................. | C11D 1/88 510/438 |
| 2005/0120497 | A1* | 6/2005 | Lynde ..................... | A47L 13/20 15/228 |
| 2006/0293201 | A1* | 12/2006 | Simon .................. | C11D 3/2086 510/235 |
| 2008/0254084 | A1 | 10/2008 | Behrends | |
| 2013/0055517 | A1* | 3/2013 | McKiernan .......... | C11D 17/049 162/146 |
| 2013/0177518 | A1* | 7/2013 | Nielsen .................. | C11D 1/835 514/634 |
| 2015/0328115 | A1* | 11/2015 | Gruber ................. | A61Q 17/005 546/264 |
| 2016/0015031 | A1* | 1/2016 | Pesaro ................... | A01N 35/04 514/689 |
| 2019/0104735 | A1* | 4/2019 | Gundlapalli ............ | A47L 13/17 |
| 2020/0323965 | A1* | 10/2020 | Fallon ..................... | A61P 17/00 |

FOREIGN PATENT DOCUMENTS

| | | |
|---|---|---|
| EP | 2443925 A1 | 4/2012 |
| WO | 2007031519 A2 | 3/2007 |
| WO | WO2018158763 A1 | 9/2018 |
| WO | WO2019121380 A1 | 6/2019 |

OTHER PUBLICATIONS

Extended European Search Report; Application No. 19188856.9-1110; dated Jan. 23, 2020; 8 pages.

Hübner, N.-O., et al.; Octenidine Dihydrochloride, a Modern Antiseptic for Skin, Mucous Membranes and Wounds; Skin Pharmacology and Physiology; vol. 23; No. 5; 2010; pp. 244-258.

Wiegand, Cornelia, et al.; pH Influence on Antibacterial Efficacy of Common Antiseptic Substances; Skin Pharmacology and Physiology; vol. 28; No. 3; 2015; pp. 147-158.

International Search Report and Written Opinion; Application Ser. No. PCT/S2020/070285; dated Oct. 2, 2020; 12 pages.

\* cited by examiner

*Primary Examiner* — Gregory R Delcotto
(74) *Attorney, Agent, or Firm* — Carolyn S. Powell

(57) ABSTRACT

An antimicrobial cleaning composition having a pH of from about 9 to about 14 wherein the composition comprises a bispyridinium alkane antimicrobial active and the composition is substantially free of a quaternary ammonium antimicrobial active.

12 Claims, No Drawings

ANTIMICROBIAL COMPOSITION

FIELD OF THE INVENTION

The present invention is in the field of antimicrobial compositions. In particular, it relates to a high pH composition comprising a bispyridinium alkane antimicrobial active.

BACKGROUND OF THE INVENTION

Antibacterial household cleaners often comprise antibacterial actives such as quaternary ammonium compounds to provide surface sanitization or disinfection, these compounds tend to be deposited on the surface as a visible residue, which leaves the user with an impression that the treated surface has not been cleaned well. This is because the surface appears streaky and has poor shine. Moreover, the treated surface can feel slightly sticky, which further leaves an impression with the user of poor cleaning. In addition, quaternary ammonium compounds typically interact with the cleaning surfactants present in the composition. The result is that the antimicrobial efficacy of the composition is reduced, or else, higher levels of the antimicrobial active must be present. The use of high levels of quaternary ammonium antibacterial actives in cleaning products might not be desirable for environmental reasons. Another drawback is that their level is restricted in products to be used on food contact surfaces.

More environmentally friendly antibacterial products can be made using natural acids such as lactic acid or citric acid, and/or botanical extracts, but the products based on botanical extracts do not have a robust, fast acting antibacterial efficacy, and the acidic products do not provide good removal of greasy soils. There is therefore the need for an antibacterial cleaner that has a good environmental and human safety profile, that shows strong antibacterial efficacy, that can be used on food contact surfaces and that shows good cleaning, even on tough greasy soils, and leaves the surfaces shiny and without streaks.

SUMMARY OF THE INVENTION

According to the first aspect of the present invention, there is provided an antimicrobial cleaning composition.

According to the second aspect of the invention there is provided an article treated with the composition of the first aspect of the invention. The article is preferably in the form of any disposable or partially reusable substrate comprising one or more nonwoven layers. The article provides sanitization to surfaces, in particular hard surfaces. The article is sometimes herein referred to as "the article of the invention".

According to the third aspect of the present invention, there is provided a method of sanitizing a surface using the composition of the invention.

The elements of the composition of the invention described in relation to the first aspect of the invention apply *mutatis mutandis* to the other aspects of the invention.

DETAILED DESCRIPTION OF THE INVENTION

The present invention encompasses an antimicrobial composition. The composition is alkaline and have a pH of from 9 to 14, preferably from 10 to 13. The composition comprises bispyridinium alkane, preferably octenidine dihydrochloride. The composition is substantially free of a quaternary ammonium antimicrobial active. By "substantially free" of quaternary ammonium antimicrobial active is herein meant that the composition comprises less than 0.001% by weight of the composition of quaternary ammonium antimicrobial active.

Quaternary ammonium compounds include compounds of formula (A):

wherein $R^1$ and $R^2$ are each independently a straight chain, unsubstituted and uninterrupted $C_8$-$C_{12}$ alkyl group and $X^-$ is a halide anion such as chloride, bromide, fluoride, iodide or sulphonate, saccharinate, carbonate or bicarbonate, and benzalkonium compounds having the formula (B)

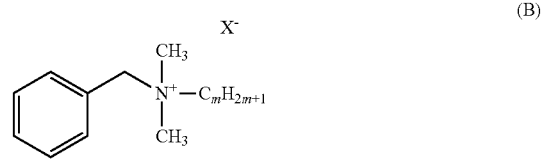

wherein m is from 8 to 18, and $X^-$ is a halide anion such as chloride, bromide, fluoride, iodide, sulphonate, saccharinate, carbonate or bicarbonate. This benzalkonium compounds usually comprise a mixture of $C_8$-$C_{18}$ alkyl groups, particularly a mixture of straight chain, unsubstituted and uninterrupted alkyl groups such as n-$C_8H_{17}$ to n-$C_{18}H_{37}$, mainly n-$C_{12}H_{25}$ (dodecyl), n-$C_{14}H_{29}$ (tetradecyl), and n-$C_{16}H_{33}$ (hexadecyl).

In the compounds of formula (A) each group $R^1$ and $R^2$ is independently a straight chain, unsubstituted, uninterrupted $C_{8-12}$ alkyl group, for example an alkyl group containing 8, 9, 10, 11 or 12 carbon atoms. The groups $R^1$ and $R^2$ may contain equal or different numbers of carbon atoms.

Examples of quaternary ammonium compounds of formula (A) include di-n-decyldimethyl ammonium chloride, octyl decyl dimethyl ammonium chloride and dioctyl dimethyl ammonium chloride.

The composition of the invention is well suited to be used to treat hard surfaces and fabrics. The composition is preferably a liquid aqueous composition comprising at least 80% by weight of water. The composition may comprise from 90% to 99.5%, preferably from 95% to 99% and more preferably from 96% to 99% by weight of the total composition of water.

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

Antimicrobial Cleaning Composition

The composition of the invention is suitable to be used on hard surfaces. The composition can be delivered onto the surface, by for example spraying the composition, followed by wiping the surface, preferably without rinsing or by using a substrate, such as a wipe impregnated with the composition of the invention.

As used herein, the terms "microbe" or "microbial" should be interpreted to refer to any of the microscopic organisms studied by microbiologists or found in the use environment of a treated surface. Such organisms include, but are not limited to, bacteria and fungi as well as other single-celled organisms such as mould, mildew and algae. Viruses (enveloped and non-enveloped) and other infectious agents are also included in the term microbe.

"Antimicrobial" further should be understood to encompass both microbiocidal and microbiostatic properties. That is, the term includes microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad-spectrum activity (e.g. against bacteria and fungi, or against bacteria and viruses). When speaking of efficacy against a particular microorganism or taxonomic rank, the more focused term will be used (e.g. antifungal to denote efficacy against fungal growth in particular). Using the above example, it should be understood that efficacy against fungi does not in any way preclude the possibility that the same antimicrobial composition may demonstrate efficacy against another class of microbes.

By "hard surface", it is meant herein hard surfaces found in households, especially domestic households. Surfaces to be cleaned include kitchens and bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, steel, kitchen work surfaces, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments.

The composition of the invention is also suitable to be used on fabrics, either directly, by for example spraying the composition onto the fabric, or in a washing machine during the pre-wash, main wash or one of the rinses.

The liquid compositions herein are aqueous compositions, comprising at least 80% by weight of water, preferably from 85% to 98% and more preferably from 90% to 96% by weight of the composition of water.

The compositions of the present invention preferably can be non-thickened, or water like, having a viscosity of from 1 mPa·s to 20 Pa·s, or can be thickened, having a viscosity of from 50 Pa·s to 1200 Pa·s, more preferably 100 Pa·s to 800Pa·s, most preferably 200 Pa·s to 600 Pa·s when measured at 20° C. with a AD1000 Advanced Rheometer from Atlas® shear rate 10 s$^{-1}$ with a coned spindle of 40 mm with a cone angle 2° and a truncation of ±60 μm.

The high pH of the composition helps with cleaning, especially greasy soil and particulate greasy soil removal.

The pH of the composition is from 9 to 14, preferably from 10 to 13. Accordingly, the compositions herein can comprise a base to adjust the pH.

A suitable base to be used herein is an organic and/or inorganic base. Suitable bases for use herein are the caustic alkalis, such as sodium hydroxide, potassium hydroxide and/or lithium hydroxide, and/or the alkali metal oxides such, as sodium and/or potassium oxide or mixtures thereof. A preferred base is a caustic alkali, more preferably sodium hydroxide and/or potassium hydroxide.

Other suitable bases include ammonia, ammonium carbonate, $K_2CO_3$, $Na_2CO_3$ and alkanolamines such as monoethanolamine, triethanolamine, aminomethylpropanol, and mixtures thereof, nitrogenous buffers, and mixtures thereof. Suitable nitrogenous buffers include: ammonium or alkaline earth carbamates, guanidine derivatives, ammonium carbonate, ammonium bicarbonate, diammonium carbonate, ammonium hydroxide, ammonia (which forms ammonium hydroxide in situ when added to water) and mixtures thereof. Particularly preferred bases are alkanolamines such as monoethanolamine and triethanolamine Typical levels of such bases, when present, are from 0.01% to 5.0% by weight of the total composition, preferably from 0.05% to 3.0% and more preferably from 0.1% to 2.0%.

Antimicrobial Agent

The composition of the invention includes bispyridinium alkanes, such as the ones described in GB1533952. The term bispyridinium alkane comprises the bis[4-(substituted-amino)-1-pyridinium]alkanes of the general formulae (I) or (II)

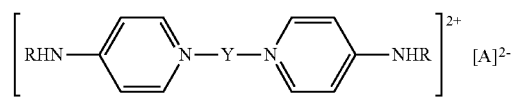

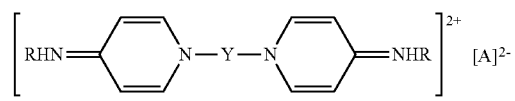

in which

Y is an alkylene or alkyl group having 4 to 18 carbon atoms,

R represents an alkyl group having 6 to 18 carbon atoms or a cycloalkyl group having 5 to 7 carbon atoms or a phenyl group with or without halogen substitution, and A is an anion or several anions.

A may be a monovalent, divalent or a polyvalent anion, for example chloride, bromide, phosphate or orthosilicate. A may also be an organic acid having the formula R4-COO~, wherein R4 is hydrogen, hydroxyl, or C1-C40 alkyl.

Bispyridinium alkanes of the present invention comprise the various prototypes of the compounds of the formula (I) and (II) such as, for example, the ones disclosed in GB1533952 and DE19647692A1.

Other suitable bispyridinium alkanes comprise an organic acid salt of a bispyridine amine where the organic acid contains from about 4 to about 30 carbon atoms, such as, for example, the ones described in WO2014100807. Suitable organic acids include but are not limited to, carboxylic acids, such as (C1-C40) alkanecarboxylic acids which, for example, are unsubstituted or substituted by halogen, saturated or unsaturated dicarboxylic acids, such as hydroxycarboxylic acids, such as amino acids, such as (C1-C40) alkylsulfonic acids. Additional organic acids from which salts can be derived include, for example, acetic acid, propionic acid, phosphoric acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, glycyrrhizinic acid, salicylic acid, stearic acid, phosphonic acid, trifluoroacetic acid, cyanoacetic acid, 4-cyanobenzoic acid, 2-chlorobenzoic acid, 2-nitrobenzoic acid, phenoxyacetic acid, benzenesulfonic acid. Preferred are salts of stearate such as bispyridinium alkane distearate.

Preferred bispyridinium alkane is octenidine dihydrochloride (R=n-octyl, Y=n-decenyl; A=2×Cl, hereinbelow "octenidine" CAS number 70775-75-6).

The antimicrobial agent needs only be present in germicidally effective amounts, which can be as little as 0.001% to less than 1% by weight of the composition. In more preferred compositions, the cleaning composition comprises the antimicrobial agent at a level of from from about 0.0025 to about 0. 5%, more preferably from 0.005% to 0.15% by weight of the composition.

A germicidally effective amount of the antimicrobial agent typically results in at least a log 4 reduction of Staphylococcus aureus, using the method of EN13697 (Chemical Disinfectants Bactericidal Activity Testing), in 5 minutes.

Surfactant

The composition of the invention preferably comprises surfactants, more preferably from 0.01% to 12%, preferably from 0.05% to 10%, more preferably from 0.08% to 5%, more preferably 0.1% to 3% by weight of the composition of surfactant. The surfactant contributes to the cleaning provided by the composition.

Alcohol Alkoxylated Nonionic Surfactants

Suitable alcohol alkoxylated nonionic surfactants are according to the formula RO-(A)nH, wherein: R is a primary $C_4$ to $C_{18}$, preferably a $C_6$ to $C_{16}$, more preferably a $C_6$ to $C_{14}$ branched or linear alkyl chain, or a $C_6$ to $C_{28}$ alkyl benzene chain; A is an ethoxy or propoxy or butoxy unit, or mixtures thereof, and wherein n is from 1 to 30, preferably from 1 to 15, more preferably from 3 to 12 even more preferably from 3 to 8. Preferred R chains for use herein are the $C_6$ to $C_{16}$ linear or branched alkyl chains.

Suitable branched alkoxylated alcohol may be selected from the group consisting of: $C_4$-$C_{10}$ alkyl branched alkoxylated alcohols, and mixtures thereof. The branched alkoxylated alcohol can be derived from the alkoxylation of $C_4$-$C_{10}$ alkyl branched alcohols selected form the group consisting of: $C_4$-$C_{10}$ primary mono-alcohols having one or more $C_1$-$C_4$ branching groups.

By $C_4$-$C_{10}$ primary mono-alcohol, it is meant that the main chain of the primary mono-alcohol has a total of from 4 to 10 carbon atoms. The $C_4$-$C_{10}$ primary mono-alcohol can be selected from the group consisting of: methyl butanol, ethyl butanol, methyl pentanol, ethyl pentanol, methyl hexanol, ethyl hexanol, propyl hexanol, dimethyl hexanol, trimethyl hexanol, methyl heptanol, ethyl heptanol, propyl heptanol, dimethyl heptanol, trimethyl heptanol, methyl octanol, ethyl octanol, propyl octanol, butyl octanol, dimethyl octanol, trimethyl octanol, methyl nonanol, ethyl nonanol, propyl nonanol, butyl nonanol, dimethyl nonanol, trimethyl nonanol and mixtures thereof.

The $C_4$-$C_{10}$ primary mono-alcohol can be selected from the group consisting of: ethyl hexanol, propyl hexanol, ethyl heptanol, propyl heptanol, ethyl octanol, propyl octanol, butyl octanol, ethyl nonanol, propyl nonanol, butyl nonanol, and mixtures thereof.

Preferably the $C_4$-$C_{10}$ primary mono-alcohol is selected from the group consisting of: ethyl hexanol, propyl hexanol, ethyl heptanol, propyl heptanol, and mixtures thereof.

The $C_4$-$C_{10}$ primary mono-alcohol is most preferably ethyl hexanol, and propyl heptanol.

In the branched alkoxylated alcohol, the one or more $C_1$-$C_4$ branching group can be substituted into the $C_4$-$C_{10}$ primary mono-alcohol at a C1 to C3 position, preferably at the C1 to C2 position, more preferably at the C2 position, as measured from the hydroxyl group of the starting alcohol.

The branched alkoxylated alcohol can comprise from 1 to 14, preferably from 2 to 7, more preferably from 4 to 6 ethoxylate units, and optionally from 1 to 9, preferably from 2 to 7, more preferably from 4 to 6 of propoxylate units.

The branched alkoxylated alcohol is preferably 2-ethyl hexan-1-ol ethoxylated to a degree of from 4 to 6, and propoxylated to a degree of from 4 to 6, more preferably, the alcohol is first propoxylated and then ethoxylated. Another preferred branched alkoxylated alcohols are 2-alkyl-1-alkanols such as alkoxylated $C_{10}$ guerbet alcohols with 1 to 14, preferably from 2 to 7, more preferably from 3 to 6 ethoxylate or ethoxylate-propoxylate units.

Non-limiting examples of suitable branched alkoxylated alcohols are, for instance, Ecosurf® EH3, EH6, and EH9, commercially available from DOW, and Lutensol® XP alkoxylated Guerbet alcohols & Lutensol® XL ethoxylated Guerbet alcohols available from BASF.

Linear alcohol alkoxylated nonionic surfactants preferred herein are alkoxylated nonionic surfactants with a $C_8$, $C_{10}$, $C_{12}$, mixtures of $C_8$ to $C_{10}$, mixtures of $C_{10}$ to $C_{12}$, mixtures of $C_9$ to $C_{11}$ linear alkyl chain and 8 or less ethoxylate units, preferably 3 to 8 ethoxylate units. Non-limiting examples of suitable linear alkoxylated nonionic surfactants for use herein are Dobanol® 91-2.5 (R is a mixture of $C_9$ and $C_{11}$ alkyl chains, n is 2.5), Dobanol® 91-5 (R is a mixture of $C_9$ to $C_{11}$ alkyl chains, n is 5); Dobanol® 91-10 (R is a mixture of $C_9$ to $C_{11}$ alkyl chains, n is 10); Greenbentine DE60 (R is a C10 linear alkyl chain, n is 6); Marlipal 10-8 (R is a $C_{10}$ linear alkyl chain, n is 8); Neodol 91-8 (R is a mixture of $C_9$ to $C_{11}$ alkyl chains, n is 8); Empilan® KBE21 (R is a mixture of $C_{12}$ and $C_{14}$ alkyl chains, n is 21); Lutensol ON30 (R is $C_{10}$ linear alkyl chain, n is 3); Lutensol ON50 (R is $C_{10}$ linear alkyl chain, n is 5); Lutensol ON70 (R is $C_{10}$ linear alkyl chain, n is 7); Novel 610-3.5 (R is mixture of $C_6$ to $C_{10}$ linear alkyl chains, n is 3.5); Novel 810FD-5 (R is mixture of $C_8$ to $C_{10}$ linear alkyl chains, n is 5); Novel 10-4 (R is $C_{10}$ linear alkyl chain, n is 4); Novel 1412-3 (R is mixture of $C_{12}$ to $C_{14}$ linear alkyl chains, n is 3); Lialethl® 11-5 (R is a $C_{11}$ linear alkyl chain, n is 5); Lialethl® 11-21 (R is a mixture of linear and branched $C_{11}$ alkyl chain, n is 21), or mixtures thereof.

The alkoxylated nonionic surfactant may be a secondary alcohol ethoxylate such as for example the Tergitol™-15-S surfactants having the general formula shown below and commercially available from DOW

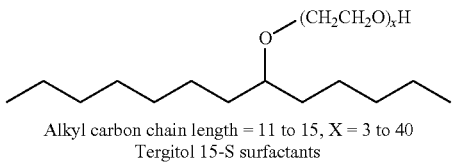

Alkyl carbon chain length = 11 to 15, X = 3 to 40
Tergitol 15-S surfactants

Preferred secondary alcohol ethoxylate surfactants have 3-9 EO units.

Another suitable alkoxylated nonionic surfactant is an alkyl ethoxy alkoxy alcohol, preferably wherein the alkoxy part of the molecule is propoxy, or butoxy, or propoxy-butoxy. More preferred alkyl ethoxy alkoxy alcohols are of formula (II):

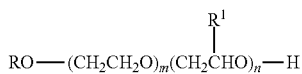

Formula (II)

wherein:
R is a branched or unbranched alkyl group having 8 to 16 carbon atoms;
$R^1$ is a branched or unbranched alkyl group having 1 to 5 carbon atoms;
n is from 1 to 10; and m is from 6 to 35.
R is preferably from 12 to 15, preferably 13 carbon atoms. $R^1$ is preferably a branched alkyl group having from 1 to 2 carbon atoms. n is preferably 1 to 5. m is preferably from 8 to 25. Preferably, the weight average molecular weight of the ethoxylated alkoxylated nonionic surfactant of formula (II) is from 500 to 2000g/mol, more preferably from 600 to 1700 g/mol, most preferably 800 to 1500 g/mol.

The ethoxylated alkoxylated nonionic surfactant can be a polyoxyalkylene copolymer. The polyoxyalkylene copolymer can be a block-heteric ethoxylated alkoxylated nonionic surfactant, though block-block surfactants are preferred. Suitable polyoxyalkylene block copolymers include ethylene oxide/propylene oxide block polymers, of formula (III):

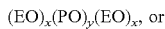

wherein EO represents an ethylene oxide unit, PO represents a propylene oxide unit, and x and y are numbers detailing the average number of moles ethylene oxide and propylene oxide in each mole of product. Such materials tend to have higher molecular weights than most non-ionic surfactants, and as such can range between 1000 and 30000 g/mol, although the molecular weight should be above 2200 and preferably below 13000 to be in accordance with the invention. A preferred range for the molecular weight of the polymeric non-ionic surfactant is from 2400 to 11500 Daltons. BASF (Mount Olive, N.J.) manufactures a suitable set of derivatives and markets them under the Pluronic trademarks. Examples of these are Pluronic (trademark) F77, L62 and F88 which have the molecular weight of 6600, 2450 and 11400 g/mol respectively.

Other suitable ethoxylated alkoxylated nonionic surfactants are described in Chapter 7 of Surfactant Science and Technology, Third Edition, Wiley Press, ISBN 978-0-471-68024-6.

Most preferably the alkoxylated nonionic surfactant is selected from the group consisting of: 2-propylheptyl EO8 (Lutensol XL89-BASF); 2-propylheptyl EO5 (Lutensol XL50-BASF); $C_{10}$ alcohol EO5 (Lutensol ON 50-BASF); $C_{10}$-alcohol EO7 (Lutensol ON 70-BASF); $C_8$-$C_{10}$ EO5 (Novel 810 FD5 Sasol); $C_{10}$ EO4 (Novel 10-4 Sasol); Tergitol 15-S-3; Tergitol 15-S-5; Tergitol 15-S-7; and Ethyl hexanol PO5EO6 (Ecosurf EH6-Dow). These surfactants have surprisingly been found to potentiate the antibacterial efficacy of octenidine.

Alkyl Polyglucosides

Alkyl polyglucosides are biodegradable nonionic surfactants which are well known in the art and can be used in the compositions of the present invention. Suitable alkyl polyglycosides can have the general formula $C_nH_{2n+n}O(C_6H_{10}O_5)_xH$ wherein n is preferably from 8 to 16, more preferably 8 to 14, and x is at least 1. Examples of suitable alkyl polyglucoside surfactants are the TRITON™ alkyl polyglucosides from Dow; Agnique P G, Disponil A P G and Glucopon alkyl polyglucosides from BASF. Preferred alkyl polyglucoside surfactants are those where n is 8 to 12, more preferably 8 to 10, such as for example Triton™ CG50 (Dow). These surfactants have surprisingly been found to enhance the antimicrobial efficacy of octenidine.

Amine Oxide

Suitable amine oxide surfactants include: $R_1R_2R_3NO$ wherein each of $R_1$, $R_2$ and $R_3$ is independently a saturated or unsaturated, substituted or unsubstituted, linear or branched hydrocarbon chain having from 1 to 30 carbon atoms. Preferred amine oxide surfactants are amine oxides having the following formula: $R_1R_2R_3NO$ wherein R1 is a hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. R1 may be a saturated or unsaturated, substituted or unsubstituted linear or branched hydrocarbon chain.

Highly preferred amine oxides are $C_8$ dimethyl amine oxide, $C_{10}$ dimethyl amine oxide, $C_{12}$ dimethyl amine oxide, $C_{14}$ dimethyl amine oxide, and mixtures thereof $C_8$ dimethyl amine oxide is commercially available under the trade name Genaminox® OC from Clariant; $C_{10}$ dimethyl amine oxide is commercially available under the trade name Genaminox® K-10 from Clariant; $C_{12}$ dimethyl amine oxide is commercially available under the trade name Genaminox® LA from Clariant and of Empigen OB from Huntsman; $C_{14}$ amine oxide is commercially available under the trade name of Empigen OH 25 from Huntsman Other suitable amine oxide surfactants are cocoyldiethoxy amine oxide available under the trade name of Genaminox CHE from Clariant, and cocamydopropyl amine oxide commercially available under the trade name of Empigen OS/A from Huntsman Particularly preferred amine oxide surfactants are $C_{10}$ dimethyl amine oxide such as Genaminox K-10. These surfactants have surprisingly been found to greatly enhance octenidine antibacterial efficacy.

Alkyl Glucamide Surfactants

The composition of the invention may comprise an alkyl glucamide surfactant. Glucamide surfactants are non ionic surfactants in which the hydrophilic moiety (an amino-sugar derivative) and the hydrophobic moiety (a fatty acid) are linked via amide bonds. This results in a chemical linkage, which is highly stable under alkaline conditions. Particularly preferred alkyl glucamide surfactants are N-alkyl-N-acyl-glucamides of the formula (III):

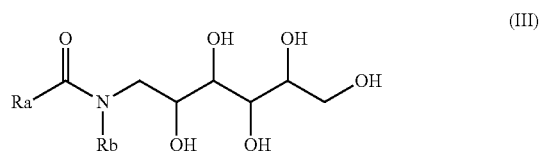

Wherein Ra is a linear or branched, saturated or unsaturated hydrocarbyl group having 6 to 22 carbon atoms, and Rb is a $C_1$-$C_4$ alkyl group. Particularly preferably, Rb in formula (I) is a methyl group. Non-limiting examples of these glucamide surfactants are: N-octanoyl-N-methylglucamide, N-nonanoyl-N-methylglucamide, N-decanoyl-N-methylglucamide, N-dodecanoyl-N-methylglucamide, N-cocoyl-N-methylglucamide, available under the trade name of GlucoPure Foam from Clariant, N-lauroyl/myristoyl-N-methylglucamide, (available under the trade name of GlucoPure Deg from Clariant, and N-octanoyl/decanoyl-N-methylglucamide, available under the trade name of GlucoPure Wet by Clariant.

Alkyl glucamine surfactants are suitable for the composition of the invention.

These surfactants are described in EP16184415 and US20190055496.

Zwitterionic and Amphoteric Surfactants

The hard surface cleaning composition may comprise an amphoteric surfactant, a zwitterionic surfactant, and mixtures thereof. Suitable zwitterionic surfactants typically contain both cationic and anionic groups in substantially equivalent proportions so as to be electrically neutral at the pH of use, and are well known in the art. Some common examples of zwitterionic surfactants are described in US. Pat. Nos. 2,082,275, 2,702,279 and 2,255,082.

Suitable zwitteronic surfactants include betaines such alkyl betaines, alkylamidobetaine, amidazoliniumbetaine, sulfobetaine (INCI Sultaines) as well as the phosphobetaine.

Suitable betaines are the alkyl betaines of the formula (Ia), the alkyl amido betaine of the formula (Ib), the sulfo betaines of the formula (Ic) and the amido sulfobetaine of the formula (Id);

R1—N+(CH3)2—CH2COO— (Ia)

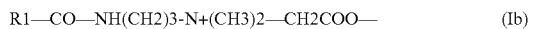

R1—CO—NH(CH2)3-N+(CH3)2—CH2COO— (Ib)

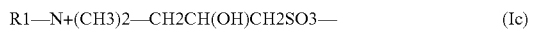

R1—N+(CH3)2—CH2CH(OH)CH2SO3— (Ic)

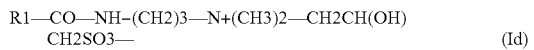

R1—CO—NH-(CH2)3—N+(CH3)2—CH2CH(OH)CH2SO3— (Id)

in which R1 is a saturated or unsaturated $C_6$-$C_{22}$ alkyl residue, preferably $C_8$-$C_{18}$ alkyl residue. Particularly preferred are betaines of the formula Ia such as for example N-alkyl-N-dimethyl betaine like the one sold under the trade name of Empigen® BB by Huntsman.

If the composition comprises a zwitterionic surfactant, it is preferably a betaine of the formula Ia such as for example N-alkyl-N-dimethyl betaine like the one sold under the trade name of Empigen BB by Huntsman It has been found these betaines greatly increase the antibacterial efficacy of octenidine hydrochloride.

Amphoteric surfactants can be either cationic or anionic depending upon the pH of the composition. Suitable amphoteric surfactants include dodecylbeta-alanine, N-alkyltaurines such as the one prepared by reacting dodecylamine with sodium isethionate, as taught in US. Pat. No. 2,658,072, N-higher alkylaspartic acids such as those taught in U.S. Pat. No. 2,438,091. Other suitable amphoteric surfactants are the products sold under the trade name Miranol by Solvay-Novecare such as, for example, sodium lauroamphoacetate (Miranol Ultra L-32E), sodium stearoampho acetate (Miranol DM), disodium cocoamphodiacetate (Miranol C2m Conc NP), disodium lauroamphodiacetate (Miranol BM Conc), disodium capryloampho dipropionate (Miranol JBS), sodium mixed $C_8$ amphocarboxylate (Miranol JEM Conc), and sodium capryloampho hydroxypropyl sulfonate (Miranol JS). Other non-limiting examples of suitable amphoteric surfactants are disodium capryloamphodiacetate (Mackam 2CY 75-Solvay Novecare), octyliminodipropionate (Ampholak YJH40-Akzo Nobel), sodium lauriminodipropionate (Mirataine H2C-HA-Solvay Novecare), and sodium lauroamphohydroxypropylsulfonate (Mackam LS-Solvay Novecare). It has been found that these amphoteric surfactants do not impact negatively the antimicrobial efficacy of octenidine hydrochloride.

Other suitable additional surfactants can be found in McCutcheon's Detergents and Emulsifiers, North American Ed. 1980.

Anionic Surfactants

If anionic surfactant is present, it is preferably present at low levels, i.e. below 0.05% by weight of the composition.

Particularly preferred surfactants for use herein include nonionic surfactants, in particular branched alcohol alkoxylates, more in particular 2-ethyl hexan-1-ol ethoxylated to a degree of from 4 to 6, and propoxylated to a degree of from 4 to 6, more preferably, the alcohol is first propoxylated and then ethoxylated, and 2-alkyl-1-alkanols such as alkoxylated $C_{10}$ guerbet alcohols with 1 to 14, preferably 2 to 8, more preferably 3 to 6 ethoxylate or ethoxylate-propoxylate units. Other particularly preferred non-ionic surfactants include linear alcohol alkoxylated nonionic surfactants with $C_8$, $C_{10}$, $C_{12}$, mixtures of $C_8$ to $C_{10}$, mixtures of $C_{10}$ to $C_{12}$, mixtures of $C_9$ to $C_{11}$ linear alkyl chain and 8 or less ethoxylate units, preferably 3 to 8 ethoxylate units. Most preferably the alkoxylated nonionic surfactant is selected from the group consisting of: 2-propylheptyl EO8 (Lutensol XL89-BASF); 2-propylheptyl EO5 (Lutensol XL50-BASF); $C_{10}$ alcohol EO5 (Lutensol ON 50-BASF); $C_{10}$ alcohol EO7 (Lutensol ON 70-BASF); $C_8$-$C_{10}$ alcohol EO5 (Novel 810 FD5 Sasol); $C_{10}$ alcohol EO4 (Novel 10-4 Sasol); and 2-ethyl-hexanol PO5EO6 (Ecosurf EH6-Dow).

Other particularly preferred surfactants for use here in include linear amine oxide surfactants, in particular $C_8$-$C_{12}$ dimethyl amine oxide, more in particular $C_{10}$ dimethyl amine oxide; alkyldimethylbetaine surfactants, more in particular N,N-Dimethyl-N-dodecylglycine betaine (Empigen BB-Huntsman); alkyl glucamide surfactants such as N-alkyl-N-acylglucamide preferably N-decanoyl-N-methylglucamine, and the alkyl glucamide surfactants sold under the name of GlucoPure®, GlucoTain®, and GlucoWet® by Clariant; alkylpolyglucoside surfactants, more in particular $C_8$ to $C_{12}$ alkyl polyglucosides, more preferably $C_8$ to $C_{10}$ alkyl polyglucosides such as for example Triton CG50 (Dow)

These surfactants improve the antimicrobial activity of the bispyridinium alkane, in particular the antimicrobial activity of octenidine dihydrochloride.

Optional Ingredients

Chelating Agent

The antimicrobial cleaning composition can comprise a chelating agent. Suitable chelating agents, in combination with the surfactant system, improve the shine benefit. Chelating agent can be incorporated into the compositions in amounts ranging from 0.02% to 5.0%, preferably from 0.1% to 3.0%, more preferably from 0.2% to 2.0% and most preferably from 0.2% to 0.4% by weight of the composition.

Suitable phosphonate chelating agents include ethylene diamine tetra methylene phosphonates, and diethylene triamine penta methylene phosphonates (DTPMP), and can be present either in their acid form or as salts.

A preferred biodegradable chelating agent for use herein is ethylene diamine N,N'-disuccinic acid, or alkali metal, or alkaline earth, ammonium or substitutes ammonium salts thereof or mixtures thereof. A more preferred biodegradable chelating agent is L-glutamic acid N,N-diacetic acid (GLDA) commercially available under tradename Dissolvine 47S from Akzo Nobel.

Suitable amino carboxylates include ethylene diamine tetra acetates, diethylene triamine pentaacetates, diethylene triamine pentaacetate (DTPA), N-hydroxyethylethylenediamine triacetates, nitrilotriacetates, ethylenediamine tetrapropionates, triethylenetetraaminehexa-acetates, ethanoldiglycines, and methyl glycine diacetic acid (MGDA), both in their acid form, or in their alkali metal, ammonium, and substituted ammonium salt forms. Particularly suitable amino carboxylate to be used herein is propylene diamine tetracetic acid (PDTA) which is, for instance, commercially available from BASF under the trade name Trilon FS® and methyl glycine di-acetic acid (MGDA). Most preferred aminocarboxylate used herein is diethylene triamine pentaacetate (DTPA) from BASF. Further carboxylate chelating agents for use herein include salicylic acid, aspartic acid, glutamic acid, glycine, malonic acid or mixtures thereof.

Suitable polycarboxylates include itaconic acid and sodium polyitaconate which is, for instance, commercially available from Itaconix under the trade name of Itaconix® DSP 2K™, and Itaconix® CHT121™.

Polymers

The antimicrobial cleaning composition may comprise an additional polymer. It has been found that the presence of a specific polymer as described herein, when present, allows further improving the grease removal performance of the composition due to the specific sudsing/foaming characteristics they provide to the composition. Suitable polymers for use herein are disclosed in EP2272942 and EP2025743.

The polymer can be selected from the group consisting of: a vinylpyrrolidone homopolymer (PVP); a polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof.

Typically, the antimicrobial hard surface cleaning composition may comprise from 0.005% to 5.0%, preferably from 0.10% to 4.0%, more preferably from 0.1% to 3.0% and most preferably from 0.20% to 1.0% by weight of the composition of said polymer.

Solvent

The liquid compositions of the present invention may comprise a solvent or mixtures thereof as a preferred optional ingredient.

Suitable solvent is selected from the group consisting of: ethers and diethers having from 3 to 14 carbon atoms; glycols (such as propylene glycol), or alkoxylated glycols; alkoxylated aromatic alcohols; aromatic alcohols; alkoxylated aliphatic alcohols; aliphatic alcohols; $C_8$-$C_{14}$ alkyl and cycloalkyl hydrocarbons and halohydrocarbons; $C_6$-$C_{16}$ glycol ethers; terpenes; and mixtures thereof. Ethers such as n-butoxypropanol and glycol ethers such as dipropylene glycol n-butyl ether are particularly preferred.

When present, the solvent can be present at a level of from 0.1% to 10%, or 0.2% to 5%, or 0.5% to 3% by weight of the composition.

Thickener

The antimicrobial cleaning composition of the invention can further comprise a thickener. Suitable thickeners herein include polyacrylate based polymers, preferably hydrophobically modified polyacrylate polymers; amide polymers; hydroxyl ethyl cellulose, preferably hydrophobically modified hydroxyl ethyl cellulose, xanthan gum, hydrogenated castor oil (HCO) and mixtures thereof.

Other Optional Ingredients

The composition of the invention may comprise a variety of other optional ingredients depending on the technical benefit aimed for and the surface treated. Suitable optional ingredients for use herein include perfume, builders, other polymers, buffers, hydrotropes, colorants, stabilisers, radical scavengers, abrasives, soil suspenders, brighteners, antidusting agents, dispersants, dye transfer inhibitors, pigments, silicones and/or dyes.

A preferred composition according to the invention comprises
  a) from 0.001% to 0.5%, preferably from 0.002% to 0.1% by weight of the composition of a bispyridinium alkane, preferably octenidine dihydrochloride;
  b) from 0.05% to 2% by weight of the composition of a surfactant selected from the group consisting of amine oxide surfactant, branched alcohol alkoxylate surfactant, alkyl polyglucoside surfactant and mixtures thereof;
  c) from 0.05 to 5% by weight of the composition of a base; and
  d) from 85% to 98% by weight of the composition of water A preferred composition according to the invention comprises
  a) from 0.001% to 0.5%, preferably from 0.002 to 0.1% by weight of the composition of octenidine dihydrochloride;
  b) from 0.05% to 2% by weight of the composition of a surfactant selected from the group consisting of an amine oxide surfactant, preferably decyl dimethyl amine oxide, dodecyl dimethyl amine oxide and mixtures thereof; D-glucopyranose oligomeric decyl octyl glucoside; 2-ethylhexyl PO5EO6 alkylalkoxylate and mixtures thereof.
  c) from 0.05% to 5% by weight of the composition of a base;
  d) from 0.05% to 1% by weight of the composition of a chelant;
  e) from 0.1% to 5% of an organic solvent, preferably an aromatic alcohol, preferably phenoxyethanol, an alkyl glycol ether and mixtures thereof.
  f) from 85 to 98% by weight of the composition of water.

Wipe

The present invention also relates to an article treated with the composition of the invention. The article is preferably a wipe. Suitable wipes can be fibrous. Suitable fibrous wipes can comprise polymeric fibres, cellulose fibres, and combinations thereof. Suitable cellulose-based wipes include kitchen wipes, and the like. Suitable polymeric fibres include polyethylene, polyester, and the like. Polymeric fibres can be spun-bonded to form the wipe. Methods for preparing thermally bonded fibrous materials are described in U.S. application Ser. No. 08/479,096 (see especially pages 16-20) and U.S. Pat. No. 5,549,589 (see especially Columns 9 to 10). Suitable pads include foams and the like, such as HIPE-derived hydrophilic, polymeric foam. Such foams and methods for their preparation are described in U.S. Pat. No. 5,550,167; and U.S. patent application Ser. No. 08/370,695.

The load factor is defined as the weight ratio of antimicrobial solution to nonwoven substrate is preferably from about 3× to about 10×. Preferably, the load factor is between 4× and 8×, or from 4.5× to 7.5×, or from 5× to 7×. It is found that higher load factors for the pre-moistened wipes of the invention are preferable since they help increase product mileage.

Method of Cleaning a Surface

The cleaning composition of the invention is particularly suited for cleaning surfaces selected from the group consisting of: ceramic, enamel, stainless steel, Inox®, Formica®, vinyl, no-wax vinyl, linoleum, melamine, glass, plastics and plastified wood, and combinations thereof. In particular, the compositions are particularly suited for reducing the microbial population, while leaving surfaces clean, shiny and grease free.

The compositions described herein can be used neat or can be achieved by diluting with water a concentrated composition prior to applying to the surface. In preferred methods, the hard surface cleaning composition is applied neat, more preferably, the hard surface cleaning composition is sprayed onto the hard surface.

The composition can be applied by any suitable means, including using a mop, sponge, cloth, paper towel, or other suitable implement.

The hard surface may be rinsed, preferably with clean water, in an optional further step, and also as a further step, wiped, such as with a cloth or a paper towel.

In another preferred embodiment of the present invention said method of cleaning a hard surface includes the steps of applying, preferably spraying, said liquid composition onto said hard surface, leaving said liquid composition to act onto said surface for a period of time with or without applying mechanical action, and optionally removing said liquid composition, preferably removing said liquid composition by rinsing said hard surface with water and/or wiping said hard surface with an appropriate implement, e.g., a sponge, a paper or cloth towel and the like. Such compositions are often referred to as "ready-to-use" compositions. In preferred methods, the hard surface is not rinsed after application of the antimicrobial hard surface cleaning composition.

It is believed that alkaline antimicrobial compositions comprising specific surfactants, and a bispyridinium alkane antimicrobial agent such as octenidine deliver very good antimicrobial efficacy at very low octenidine levels. This strong efficacy results from the careful selection of the surfactant type and level to achieve a synergistic interaction between the surfactant and the antimicrobial active. As a result, the antimicrobial efficacy of the antimicrobial agent in the antimicrobial composition is improved. Indeed, it has been found that the antimicrobial hard surface cleaning composition of the present invention exhibits improved antimicrobial efficacy, good grease cleaning and streak-free shine.

Test Methods

A) pH measurement:

The pH is measured on the neat composition, at 25° C., using a pH meter with compatible gel-filled pH probe (such as Sartarius PT-10P meter with Toledo probe part number 52 000 100), calibrated according to the instruction manual.

B) Antibacterial Efficacy (Minimum Biocidal Concentration in Suspension):

The antimicrobial efficacy of the antimicrobial agent in the composition is determined by measuring its Minimum Biocidal Concentration (MBC). The MBC is defined as the lowest absolute concentration of the particular antimicrobial active which provides complete kill (zero bacterial growth). The MBC of the compositions herein was determined against the bacterium, Staphylococcus aureus (S.aureus—ATCC #6538), a gram positive bacterium, and against Enterobacter aerogenes (E. aerogenes a gram negative bacterium. These microorganisms are representative of natural contaminants in many consumer and industrial applications. The bacteria inoculum was prepared by transferring several colonies from a Tryptone Soy Agar (TSA) plate to a saline solution (0.85% NaCl) comprising 5% of horse serum as additional soil load when indicated, the bacteria concentration in this saline solution was determined by measuring the % Transmittance at 425 nm and adjusted by either adding more bacteria or more saline solution until the %Transmittance at 425 nm is between 23-25% which corresponds to a bacteria concentration of $10^8$ CFU/ml.

The antimicrobial agent was added to the composition at a level of 1000 ppm, or 500 ppm, or 200 ppm, or 100 ppm or 50 ppm, depending on what the Minimum Biocidal Concentration (MBC) is. 200 μL of the antimicrobial hard surface cleaning composition was dosed into one well of row A of a 96 well microtiter plate. Each subsequent well (rows B to G) were dosed with 100 μL of the same hard surface cleaning composition, without the addition of the antimicrobial agent. 100 μL of the antimicrobial hard surface cleaning composition was transferred from row A to row B and mixed. 100 μL of the composition was then transferred from row B to row C and mixed, and the process repeated to row G. As such, the concentration of the antimicrobial agent underwent two-fold dilution in adjacent wells, while the concentration of the other actives in the hard surface cleaning composition remained constant across all the wells in the same column.

10 μL of the $10^8$CFU/ml bacteria suspension in saline was added to wells A to F of the microtiter plate with row G kept as a nil bacteria control. The final volume in each well was 110 μL, except for row G which comprised 100 μL of the hard surface cleaning composition and no bacteria suspension. Bacterial inoculation to each column was staggered by 30 seconds to allow for equal incubation times in all wells so that the contact time between the bacteria and the antimicrobial active for all samples was 6 mins. After this contact time, 10 μL of each test solution was transferred to 90 μL of neutralizer solution (Modified Letheen Broth +1.5% Polysorbate 80, supplied by BioMérieux) to stop the antimicrobial action of the antimicrobial active matching the stagger of the inoculation. 2 μL of this solution was plated onto a TSA plate matching the stagger of the inoculation so that all samples are exposed to the neutralizer for the same period of time. The plate was incubated at 32.5° C. for 48 h. MBC concentration is taken as the lowest concentration of the antimicrobial active at which no visible colony growth is observed on the TSA plate.

C) Antibacterial Efficacy (Surface Disinfection):

The antimicrobial efficacy of the antimicrobial cleaning composition was tested against Staphylococcus aureus (S. aureus—ATCC #6538) with 5 minutes contact time between the composition and the bacteria according to the EN13697 surface disinfection method.

EXAMPLES

Example 1

Comparison of Antibacterial Efficacy of Bispyridinium Alkane vs other Antibacterial Actives in Alkaline Composition The antibacterial efficacy of the bispyridinium alkane octenidine dihydrochloride was compared to that of other antibacterial actives commonly used in household cleaning products. Alkaline compositions comprising 0.5% Monoethanolamine (MEA), 1.5% of Triethanolamine (TEA) and 50 ppm of the different antibacterial actives were prepared and the minimal biocidal concentration (MBC) in suspension of each antibacterial active against a gram positive bacterium (*Staphylococcus aureus*) and a gram negative bacterium (*Enterobacter aerogenes*) was measured as described above. No horse serum as additional soil was used in this test. Contact time was 6 minutes. Results are shown in Table 1.

TABLE 1

MBC in suspension of bispyridinium alkane vs other antibacterial actives

| 0.5% MEA + 1.5% TEA | MBC (ppm) S. aureus | MBC (ppm) E. aerogenes | pH |
|---|---|---|---|
| Bispyridinium alkane (1) | 3.13 | 12.5 | 11.4 |
| N-alkyl dimethyl benzyl ammonium chloride (2) | 12.5 | 12.5 | 11.4 |
| N-(3-Aminopropyl)-N-dodecylpropane-1,3-diamine (3) | 12.5 | 50 | 11.5 |
| Chlorhexidine | 50 | 50 | 11.2 |

(1) Octenidine dihydrochloride-Tokyo Chemicals
(2) BTC 65-Stepan
(3) Lonzabac 12.30-Lonza As can be seen from Table 1, the alkaline composition comprising the bispyridinium alkane has higher antibacterial efficacy than compositions comprising any of the other antimicrobial actives, as demonstrated by the lower MBC of the bispyridinium alkane vs that of the other actives in these alkaline compositions.

Example 2

Antibacterial Efficacy of Bispyridinium Alkane in Alkaline Compositions Comprising Surfactants The following alkaline compositions were prepared and the minimum biocidal concentration in suspension for the bispyridine alkane octenidine hydrochloride (supplied by Tokyo Chemicals) against *Staphylococcus aureus* was evaluated for each composition. Contact time was 6 minutes. Test was run in the presence of 5% horse serum to mimic stressed soiled conditions. Composition A does not comprise any surfactant, compositions 1 to 19 comprise the indicated surfactants. Results are shown in Table 2.

TABLE 2

MBC in suspension of Octenidine hydrochloride in the presence of different surfactants

| Composition | Ingredients | Weight % | Octenidine MBC (ppm) |
|---|---|---|---|
| A | Monoethanolamine | 0.5 | 12.5 |
|   | Triethanolamine | 1.5 |  |
| 1 | Monoethanolamine | 0.5 | 12.5 |
|   | Triethanolamine | 1.5 |  |
|   | D-glucopyranose oligomeric decyl octyl glucoside (1) | 1 |  |
| 2 | Monoethanolamine | 0.5 | 6.25 |
|   | Triethanolamine | 1.5 |  |
|   | Octyl dimethyl amine oxide (2) | 1 |  |
| 3 | Monoethanolamine | 0.5 | 3.125 |
|   | Triethanolamine | 1.5 |  |
|   | Decyl dimethyl amine oxide (3) | 1 |  |
| 4 | Monoethanolamine | 0.5 | 6.25 |
|   | Triethanolamine | 1.5 |  |
|   | Dodecyl dimethyl amine oxide (4) | 1 |  |
| 5 | Monoethanolamine | 0.5 | 12.5 |
|   | Triethanolamine | 1.5 |  |
|   | Tetradecyl dimethyl amine oxide (5) | 1 |  |
| 6 | Monoethanolamine | 0.5 | 12.5 |
|   | Triethanolamine | 1.5 |  |
|   | C12-18 dihydroxyethyl amine oxide (6) | 1 |  |
| 7 | Monoethanolamine | 0.5 | 12.5 |
|   | Triethanolamine | 1.5 |  |
|   | 2-ethylhexyl PO5EO6 alkylalkoxylate (7) | 1 |  |
| 8 | Monoethanolamine | 0.5 | 6.25 |
|   | Triethanolamine | 1.5 |  |
|   | 2-propylheptyl EO5 alkylalkoxylate (8) | 1 |  |
| 9 | Monoethanolamine | 0.5 | 12.5 |
|   | Triethanolamine | 1.5 |  |
|   | 2-propylheptyl EO8 alkylalkoxylate (9) | 1 |  |
| 10 | Monoethanolamine | 0.5 | 6.25 |
|   | Triethanolamine | 1.5 |  |
|   | C10 oxo-alcohol EO5 (10) | 1 |  |
| 11 | Monoethanolamine | 0.5 | 12.5 |
|   | Triethanolamine | 1.5 |  |
|   | C10 oxo-alcohol EO7 (11) | 1 |  |
| 12 | Monoethanolamine | 0.5 | Less than 1.56 |
|   | Triethanolamine | 1.5 |  |
|   | N,N-Dimethyl-N-dodecylglycine betaine (12) | 1 |  |
| 13 | Monoethanolamine | 0.5 | Less than 1.56 |
|   | Triethanolamine | 1.5 |  |
|   | N-decanoyl-N-methylglucamine (13) | 0.5 |  |
| 14 | Monoethanolamine | 0.5 | 200 |
|   | Triethanolamine | 1.5 |  |
|   | Cocoamydopropyl hydroxysultaine (14) | 1 |  |
| 15 | Monoethanolamine | 0.5 | 50 |
|   | Triethanolamine | 1.5 |  |
|   | Cocoamidopropyl amine oxide (15) | 1 |  |
| 16 | Monoethanolamine | 0.5 | 100 |
|   | Triethanolamine | 1.5 |  |
|   | C11-15 secondary alcohol EO40 (16) | 1 |  |
| 17 | Monoethanolamine | 0.5 | 250 |
|   | Triethanolamine | 1.5 |  |
|   | Sodium 2-ethylhexyl sulfate (17) | 1 |  |
| 18 | Monoethanolamine | 0.5 | 500 |
|   | Triethanolamine | 1.5 |  |
|   | Alkyl ethoxy sulfate | 1 |  |

TABLE 2-continued

MBC in suspension of Octenidine hydrochloride in the presence of different surfactants

| Composition | Ingredients | Weight % | Octenidine MBC (ppm) |
|---|---|---|---|
| 19 | Monoethanolamine | 0.5 | 500 |
| | Triethanolamine | 1.5 | |
| | Linear alkyl benzene sulfonate | 1 | |

(1) Triton CG 50-Dow
(2) Genaminox OC-Clariant
(3) Genaminox K-10-Clariant
(4) Empigem OB-Huntsman
(5) Empigen OH 25-Huntsman
(6) Genaminox CHE-Clariant
(7) Ecosurf EH6-Dow
(8) Lutensol XL 50-BASF
(9) Lutensol XL 89-BASF
(10) Lutensol ON 50-BASF
(11) Lutensol ON 70-BASF
(12) Empigen BB-Huntsman
(13) Sigma-Aldrich
(14) Mackam SB 50-Solvay Novacare
(15) Empigen OS/A-Huntsman
(16) Tergitol 15-S-40
(17) Texapon EHS-BASF All formulae 1-19 where prepared by adding the indicated surfactants to a solution of 1% Monoethanolamine (MEA) +3% Triethanolamine (TEA) pH 11.69, and adding deionized water to reach the desired 0.5% MEA, 1.5% TEA and 1% or 0.5% surfactant concentration. As can be seen from the very low minimal biocidal concentration values, the bispyridinium octenidine hydrochloride shows very good antimicrobial efficacy in the presence of surfactant, even in the presence of anionic surfactant like alkyl ethoxysulfate and alkyl benzene sulfonate that can be highly incompatible with antibacterial actives.

Example 3

Surface Disinfection Efficacy of Alkaline Compositions Comprising Bispyridinium Alkane vs other Antimicrobial Actives The following compositions were prepared and their surface disinfection efficacy was measured against *Staphylococcus aureus* (*S. aureus*—ATCC #6538) with 5 minutes contact time between the composition and the bacteria according to the EN13697 surface disinfection method. Compositions B*, C*, and D* are comparative compositions comprising non bispyridinium alkane antimicrobial actives, compositions 20-23 are compositions of the present invention comprising octenidine hydrochloride as antimicrobial active.

Table 3 shows *S.aureus* log reduction achieved by compositions comprising bispyridinium alkane vs the other antimicrobial actives.

TABLE 3

Surface disinfection efficacy of compositions comprising the bispyridinium alkane Octenidine hydrochloride vs other antimicrobial actives

| Ingredient | B* | C* | D* | 20 | 21 | 22 | 23 |
|---|---|---|---|---|---|---|---|
| Monoethanolamine | 0.5% | 0.5% | 0.5% | 0.5% | 0.5% | 0.5% | 0.5% |
| Triethanolamine | 1.5% | 1.5% | 1.5% | 1.5% | 1.5% | 1.5% | 1.5% |
| Phenoxyethanol | 0.5% | 0.5% | 0.5% | 0.5% | 0.5% | 0.5% | 0.5% |
| Sodium carbonate | 0.1% | 0.1% | 0.1% | 0.1% | 0.1% | 0.1% | 0.1% |
| Chelant (1) | 0.1% | 0.1% | 0.1% | 0.1% | 0.1% | 0.1% | 0.1% |
| Solvent (2) | 1% | 1% | 1% | 1% | 1% | 1% | 1% |
| D-glucopyranose oligomeric decyl octyl glucoside (3) | 0.3% | 0.3% | 0.3% | 0.3% | 0.3% | 0.3% | — |
| Decyl dimethyl amine oxide (4) | — | — | — | — | 0.3% | — | 0.75% |
| Dodecyl dimethyl amine oxide (5) | 0.3% | 0.3% | 0.3% | 0.3% | — | 0.3% | — |
| 2-ethylhexyl PO5EO6 alkylalkoxylate (6) | 0.1% | 0.1% | 0.1% | 0.1% | 0.1% | 0.1% | — |
| Chlorhexidine | 0.025% | — | — | — | — | — | — |
| N-(3-Aminopropyl)-N-dodecylpropane-1,3-diamine (7) | — | 0.1% | — | — | — | — | — |
| n-alkyl dimethyl benzyl ammonium chloride and n-alkyl dimethyl ethylbenzyl ammonium chloride (8) | — | — | 0.025% | — | — | — | — |
| Bispyridinium alkane (9) | — | — | — | 0.025% | 0.0125% | 0.0062% | 0.0031% |

TABLE 3-continued

Surface disinfection efficacy of compositions comprising the bispyridinium alkane Octenidine hydrochloride vs other antimicrobial actives

| Ingredient | B* | C* | D* | 20 | 21 | 22 | 23 |
|---|---|---|---|---|---|---|---|
| Log reduction S. aureus | 3.89 | 1.55 | 1.26 | Higher than log6 | Higher than log6 | 4.68 | 4.10 |

*Comparative formulations with non bispyridinium alkane antimicrobial actives
(1) Diethylenetriamine Pentaacetic Acid
(2) Butyldiglycolether-Dow
(3) Triton CG 50-Dow
(4) Genaminox K-10-Clariant
(5) Empigem OB-Huntsman
(6) Ecosurf EH6-Dow
(7) Lonzabac 12.30 Lonza
(8) BTC2125 Stepan
(9) Octenidine dihydrochloride-Tokyo chemicals It can be seen that the antimicrobial efficacy of compositions 20 to 23 comprising octenidine hydrochloride is much higher than the antimicrobial efficacy of comparative compositions B*, C*, and D* comprising comparative antimicrobial actives: Chlorhexidine, N-(3-aminopropyl)-N-dodecylpropane-1,3-diamine (Lonzabac 12.30-Lonza), or n-alkyl dimethyl benzyl ammonium chloride/n-alkyl dimethyl ethylbenzyl ammonium chloride (BTC2125-Stepan). Particularly, compositions 22 and 23 comprise very low levels of octenidine hydrochloride and show more than 4 log reduction on S. aureus in 5 minutes, indicating that octenidine hydrochloride can be used at much lower concentrations than other commonly used antimicrobial actives to make alkaline compositions with very powerful antimicrobial efficacy.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An antimicrobial cleaning composition comprising:
   from 0.001 to 0.5% by weight of the antimicrobial cleaning composition of octenidine dihydrochloride; and
   from 0.05% to 12% by weight of the antimicrobial cleaning composition of a surfactant, wherein:
   the surfactant is selected from the group consisting of D-glucopyranose oligomeric decyl octyl glucoside; $C_{10}$ linear alcohol alkoxylates with eight or less ethoxylate units; 2-propylheptyl alcohol alkoxylate; 2-ethylhexyl alcohol 2-ethylhexyl PO5EO6 alkylalkoxylate; N,N-dimethyl-N-dodecylglycine betaine; N-decanoyl-N-methylglucamine; N-cocoyl-N-methylglucamide; N-lauroyl/myristoyl-N-methylglucamine; N-octanoyl/decanoyl-N-methylglucamide; octyl dimethyl amine oxide; decyl dimethyl amine oxide; dodecyl dimethyl amine oxide; tetradecyl dimethyl amine oxide; C12-18 dihydroxyethyl amine oxide; and mixtures thereof,
   the antimicrobial cleaning composition has a pH from 9 to 14, and
   the antimicrobial cleaning composition is substantially free of a quaternary ammonium antimicrobial active.

2. The antimicrobial cleaning composition according to claim 1 wherein the antimicrobial cleaning composition is an aqueous liquid.

3. The antimicrobial cleaning composition according to claim 1 wherein the surfactant is selected from the group consisting of alkyl polyglucoside, fatty alcohol alkoxylate, betaine, alkyl glucamine, alkyl glucamide, amine oxide and mixtures thereof.

4. The antimicrobial cleaning composition according to claim 1 wherein the surfactant is selected from the group consisting of D-glucopyranose oligomeric decyl octyl glucoside; 2-propylheptyl alkylalkoxylate with eight or less ethoxylate-propoxylate units; 2-ethylhexyl PO5EO6 alkylalkoxylate; $C_{10}$ linear alcohol alkoxylate with eight or less ethoxylate units; N,N-dimethyl-N-dodecylglycine betaine; N-decanoyl-N-methylglucamine; octyl dimethyl amine oxide; decyl dimethyl amine oxide; dodecyl dimethyl amine oxide and mixtures thereof.

5. The antimicrobial cleaning composition according to claim 1 wherein the surfactant is selected from the group consisting of D-glucopyranose oligomeric decyl octyl glucoside, 2-ethylhexyl PO5EO6 alkylalkoxylate, N,N-dimethyl-N-dodecylglycine betaine, decyl dimethyl amine oxide, dodecyl dimethyl amine oxide and mixtures thereof.

6. The antimicrobial cleaning composition according to claim 1 further comprising from 0.025% to 5% of a chelant by weight of the composition, wherein the chelant is selected from the group consisting of: diethylenetriaminepentaacetic acid, tetrasodium glutamate diacetate; methylglycindiacetic acid; polyitaconic acid; phosphonate chelating agents, and mixtures thereof.

7. The antimicrobial cleaning composition according to claim 1 further comprising a solvent.

8. The antimicrobial cleaning composition according to claim 1 comprising
   a) from 0.001% to 0.5% of octenidine dihydrochloride by weight of the antimicrobial cleaning composition;
   b) from 0.05% to 2% of a surfactant by weight of the antimicrobial cleaning composition;
   c) from 0.05 to 5% of a base by weight of the antimicrobial cleaning composition.

9. The antimicrobial cleaning composition according to claim 1 comprising
   a) from 0.001% to 0.5% of octenidine dihydrochloride by weight of the antimicrobial cleaning composition of octenidine dihydrochloride;
   b) from 0.05% to 2% of a surfactant by weight of the antimicrobial cleaning composition, wherein the surfactant is selected from the group consisting of decyl dimethyl amine oxide; dodecyl dimethyl amine oxides; D-glucopyranose oligomeric decyl octyl glucoside; 2-ethylhexyl PO5EO6 alkylalkoxylate; and mixtures thereof.
   c) from 0.05% to 5% of a base by weight of the antimicrobial cleaning composition .;
   d) from 0.05% to 1% of a chelant by weight of the antimicrobial cleaning composition .;
   e) from 0.1% to 5% of an alkyl glycol ether by weight of the antimicrobial cleaning composition;
   0 from 80 to 99% water by weight of the antimicrobial cleaning composition.

10. An article treated with the antimicrobial cleaning composition according to claim 1 in the form of a disposable or partially reusable substrate comprising one or more nonwoven layers and the substrate has a load factor of from 3 times to 10 times of composition per gram of nonwoven substrate.

11. A method of sanitizing a hard surface comprising the step of contacting the surface with the antimicrobial cleaning composition according to claim 1.

12. A method of sanitizing a fabric comprising the step of contacting the fabric with the antimicrobial cleaning composition according to claim 1.

* * * * *